United States Patent
Ozanne et al.

(10) Patent No.: US 8,146,485 B2
(45) Date of Patent: Apr. 3, 2012

(54) MODULAR BEVERAGE PRODUCTION DEVICE WITH DOCKING STATION

(75) Inventors: Matthieu Ozanne, Chessel (CH); Fabien Ludovic Agon, Le Bouveret (CH)

(73) Assignee: Nestec S.A., Vevey (CH)

( * ) Notice: Subject to any disclaimer, the term of this patent is extended or adjusted under 35 U.S.C. 154(b) by 608 days.

(21) Appl. No.: 12/303,954

(22) PCT Filed: Jun. 8, 2007

(86) PCT No.: PCT/EP2007/055662
§ 371 (c)(1),
(2), (4) Date: Dec. 8, 2008

(87) PCT Pub. No.: WO2007/141334
PCT Pub. Date: Dec. 13, 2007

(65) Prior Publication Data
US 2010/0162897 A1    Jul. 1, 2010

(30) Foreign Application Priority Data
Jun. 9, 2006   (EP) ..................................... 06011902

(51) Int. Cl.
*A47J 31/00* (2006.01)
(52) U.S. Cl. ................. 99/282; 99/280; 99/281; 99/283; 99/284
(58) Field of Classification Search ............ 99/281, 99/282, 283, 284, 289 R, 302 R, 307, 280
See application file for complete search history.

(56) References Cited

U.S. PATENT DOCUMENTS

| | | | | |
|---|---|---|---|---|
| 4,548,129 | A * | 10/1985 | van der Sluys et al. | 99/281 |
| 5,070,222 | A * | 12/1991 | Yahav et al. | 219/621 |
| 5,560,284 | A * | 10/1996 | Weidman et al. | 99/281 |
| 5,957,033 | A * | 9/1999 | In-Albon | 99/284 |
| 7,223,427 | B2 * | 5/2007 | Knepler | 426/231 |
| 2004/0015263 | A1 | 1/2004 | Chadwell et al. | 700/216 |
| 2008/0041233 | A1 * | 2/2008 | Bunn | 99/281 |

FOREIGN PATENT DOCUMENTS
FR    2 544 185    10/1984

OTHER PUBLICATIONS

International Search Report PCT/EP2007/055662 Dated Oct. 31, 2007.

* cited by examiner

*Primary Examiner* — Reginald L Alexander
(74) *Attorney, Agent, or Firm* — Winston & Strawn LLP

(57) ABSTRACT

A hierarchical modular beverage production system that includes a docking station and a beverage production module adapted to be selectively in a connected state and a disconnected state, respectively, with the docking station. In this system, the module is provided with a fluid delivery mechanism for producing a beverage from ingredients contained in a capsule, the docking station and module are respectively provided with control circuitry with the control circuitry of the module being designed for an autonomous control of the module in the disconnected state, and the control circuitry of the docking station being designed to take over at least partially the control of the module in the connected state.

22 Claims, 5 Drawing Sheets

MODULAR BEVERAGE PRODUCTION DEVICE WITH DOCKING STATION

Figure 1:
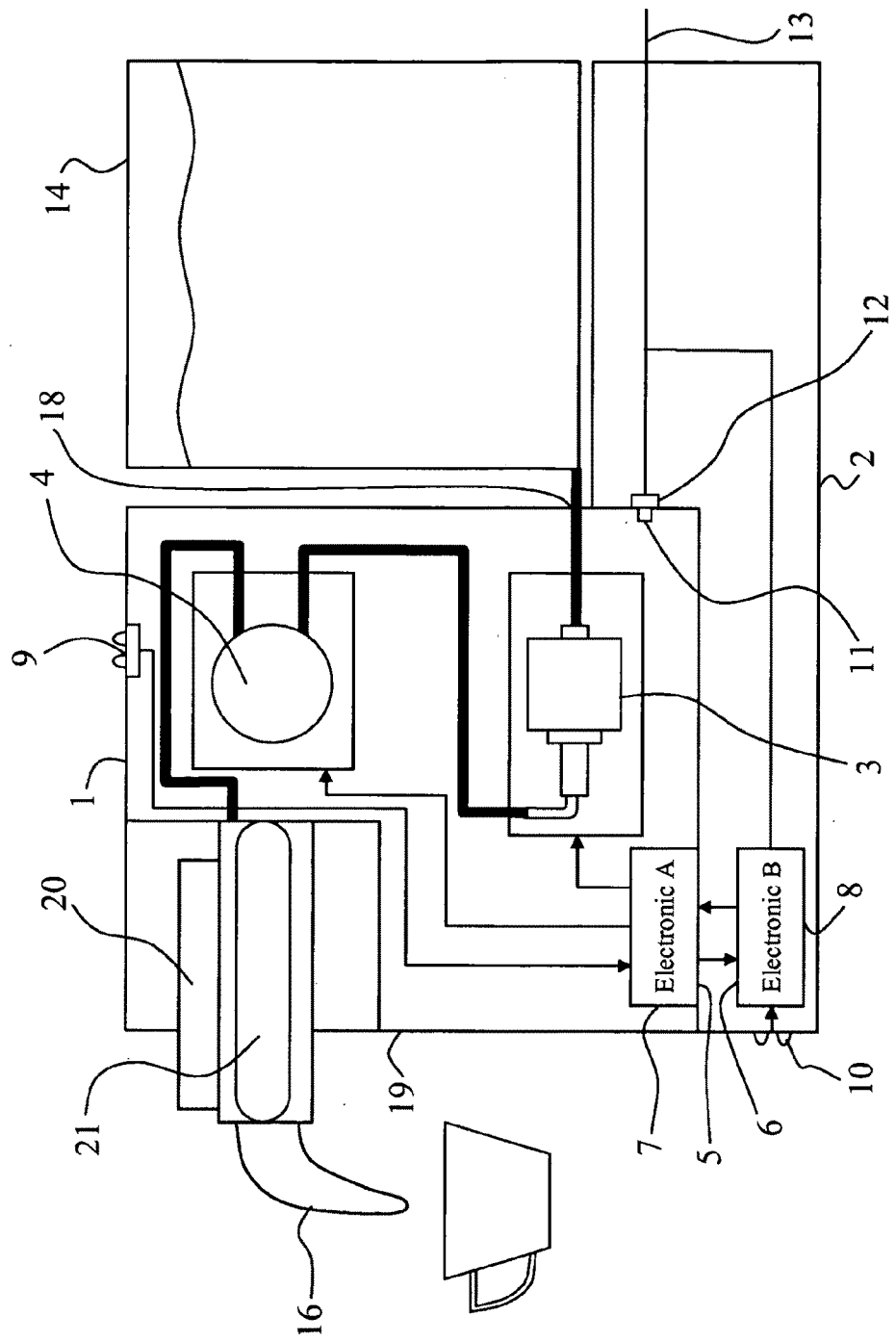

This application is a 371 filing of International Patent Application PCT/EP2007/055662 filed Jun. 8, 2007.

The present invention generally relates to the production of beverages or liquid comestibles (soup, etc.). Preferably, the invention relates to production devices which are designed to produce a beverage on the basis of ingredients which are contained in a capsule. The capsule is inserted in the beverage production device which is provided with means to introduce a liquid into the interior of the capsule. The interaction of the introduced liquid with the ingredients produces a beverage which can then be obtained from the beverage production device.

As an illustrative example, such devices are already used, among others, in the field of coffee machines. Especially regarding coffee machines there is a wide range between relatively simple "one button" machines on one end of the range, and highly complex machines with integrated additional functions, such as for example producing steam, pre-warming cups and/or ensuring a "flow stop" function, etc., at the higher end of the range.

The different machines of this range highly differ regarding functions, volume and price and are thus designed for a specified application scenario (professional/private, kitchen/office, portable/stationary, etc.)

It is the object of the present invention to propose a flexible beverage production system providing many possible solutions for upgrading functions according to needs.

It is the central ideal of the invention to solve this object by providing both a beverage production module and a docking station.

The object is especially achieved, according to one aspect of the present invention, by a hierarchical beverage production system comprising a docking station and a beverage production module adapted to be selectively in a connected state and a disconnected state, respectively, with the docking station. While the module preferably has the basic functions for producing a beverage only, the docking station can offer additional or alternative functions by offering one or more of additional electronic control resources, fluid resources, electrical power resources, user interfacing resources (control buttons, displays, . . . ) etc.

The module is provided with means for producing a beverage from ingredients contained in a capsule.

The docking station and the module are respectively provided with an electronic control circuitry. The control circuitry of the module can be designed for an autonomous control of the module in the disconnected state, i.e. in the state in which the module is not connected to the docking station. The control circuitry of the docking station can be designed to take over at least partially the control of the module upon connection of the module to the docking station.

This represents a hierarchical set-up, in which the control circuitry of the docking station has a master role slaving at least partially the control processes carried out by the electronic control circuitry of the module.

The docking station thus can have the function of enlarging or upgrading the basic functions of the module.

The docking station on the module can be respectively provided with communication interfacing means designed such that the module and the docking station can set up a bi-directional communication between the respective control circuitries.

As an example, the electronic control circuitry of the docking station can be designed to carry out an electrical power management of the docking station and the module.

The docking station can be provided with user interface means designed to control the operation of the module in the connected state. In other words, by manipulating the user interface means of the docking station, the user can influence the operation of the module.

According to a further aspect of the present invention, a modular beverage production system is provided comprising a docking station and a beverage production module adapted to be selectively in a connected state and a disconnected state, respectively, with the docking station. This connection and disconnection can e.g. be carried out by a manual user operation.

The module can comprise a water pump and a water heater connected with a water pump. An extraction chamber of the module can be designed for housing an ingredient containing capsule and for being supplied to a heated pressurised water from the water pump and the water heater.

An electronic control circuitry of the module can be designed for an autonomous control of the operation of the module when the module is not connected with the docking station.

The docking station can also comprise an electronic control circuitry which can at least partially take over the operation of the module when the module is connected to the docking station.

The module and the docking station can be respectively provided with means for transferring electrical power from the docking station to the module. Furthermore, water connection means can be provided for supplying water from the docking station to the module.

The module can be supplied from an independent, removable water tank in the disconnected state. On the other hand, in the connected state a water supply tank connected to the docking station can represent the water supply for the module.

The modular beverage production system can furthermore be equipped with data communication interfacing means for exchanging command data between the docking station and the module when in the connected state.

The docking station can comprise a steam generating circuitry which is independent from the module and which is controlled by the electronic control circuitry of the docking station.

The module can be supplied from an independent electrical supply set when in the disconnected state. On the other hand, the module can be supplied with electrical power from the docking station in the connected state.

A still further aspect of the present invention relates to a beverage production module which comprises means for exchanging control data with an external docking station. The module preferably has the basic functions for producing a beverage only and is designed to rely on the docking station for additional, upgraded or alternative functions. The docking station can be designed to offer to the module at least one or more of advanced electronic control resources, fluid resources, electrical power resources, user interfacing resources (control buttons, displays, . . . ) etc. . . .

In a mode, the communication between the docking station and the module can be carried out wire-bound or wireless e.g. using infrared communication. In an alternative, the communication between the docking station and the module can be carried out by wire connection interface means.

The module can be provided with a connector at the walls of the casing of the module for selectively connecting the module through an external power supply or to a power supply from the docking station, respectively.

The module can be provided with a water interface connector adapted to be selectively connected to external water supplying means which can be a water tank or a water supply port from the docking station.

A still further aspect of present invention relates to a docking station designed for being selectively in a connected and a disconnected state with a module as set forth above. The docking station can be designed to offer to the basic module at least one of advanced electronic control resources, fluid resources, electrical power resources, user interfacing resources (control buttons, displays, . . . ) etc. . . .

The docking station can be provided with means for supplying an essentially unpressurised liquid to the pump of the module.

The docking station can be provided with a flow meter and control means for receiving volume fluid information from the flow meter and control the stop of the pump of the module.

The docking station can comprise and additional pump and an additional water heating means to provide steam to a steam outlet of the docking station independently from the module.

Several modules can also be provided that can connect to a single docking station. The modules can thus connect to a specifically allocated place of the docking station or can be interchanged in any available place of the docking station. One advantage is to be able to increase the capacity of beverage preparation of the system by additional modules removably fitting on a single docking station depending on the user's needs.

Further features, advantages and objects of the present invention will become evident by means of the figures of the enclosed drawings as well as by the following detailed explanation of illustrative-only embodiments of the present invention.

Figure 2:
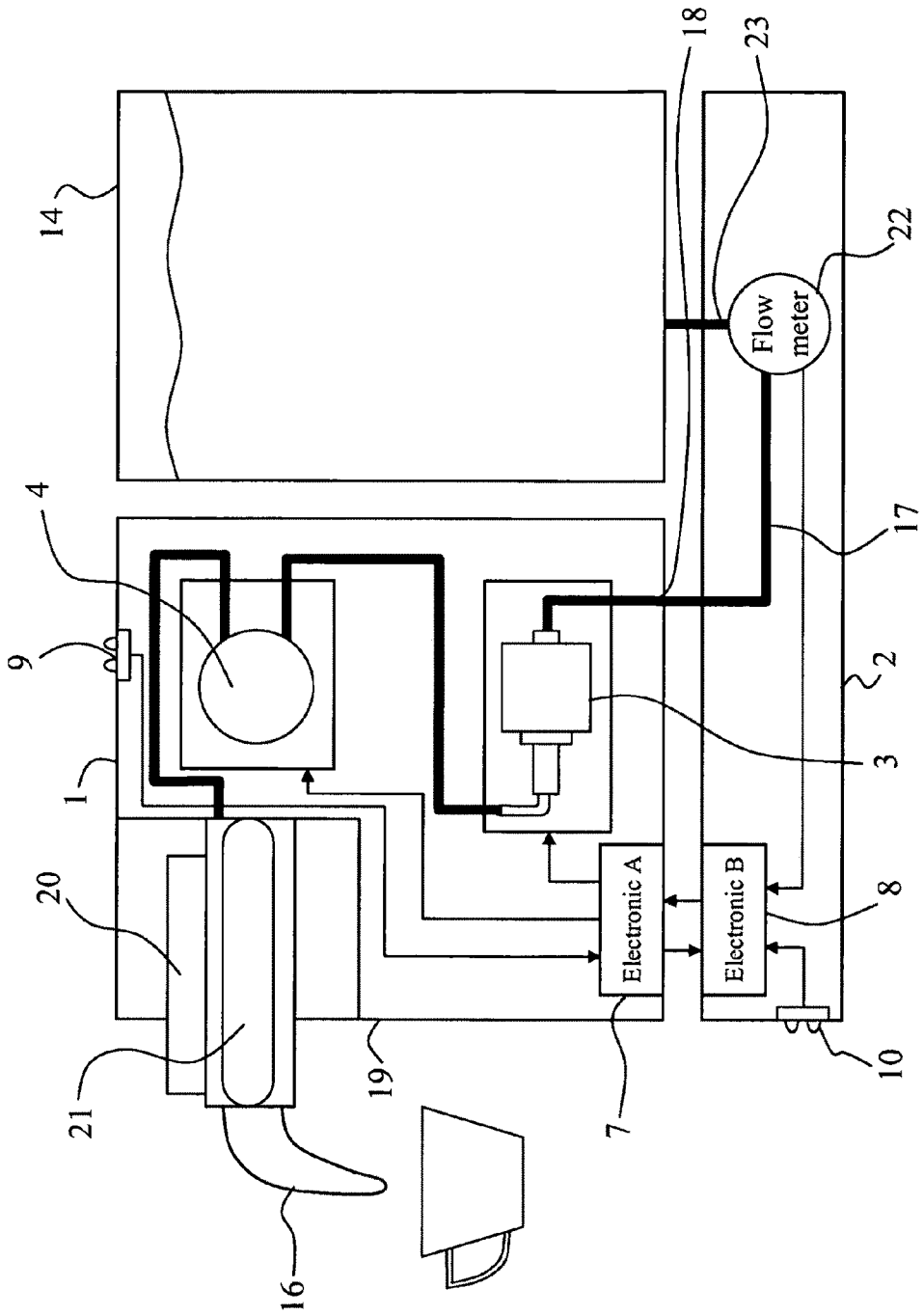
Figure 3:
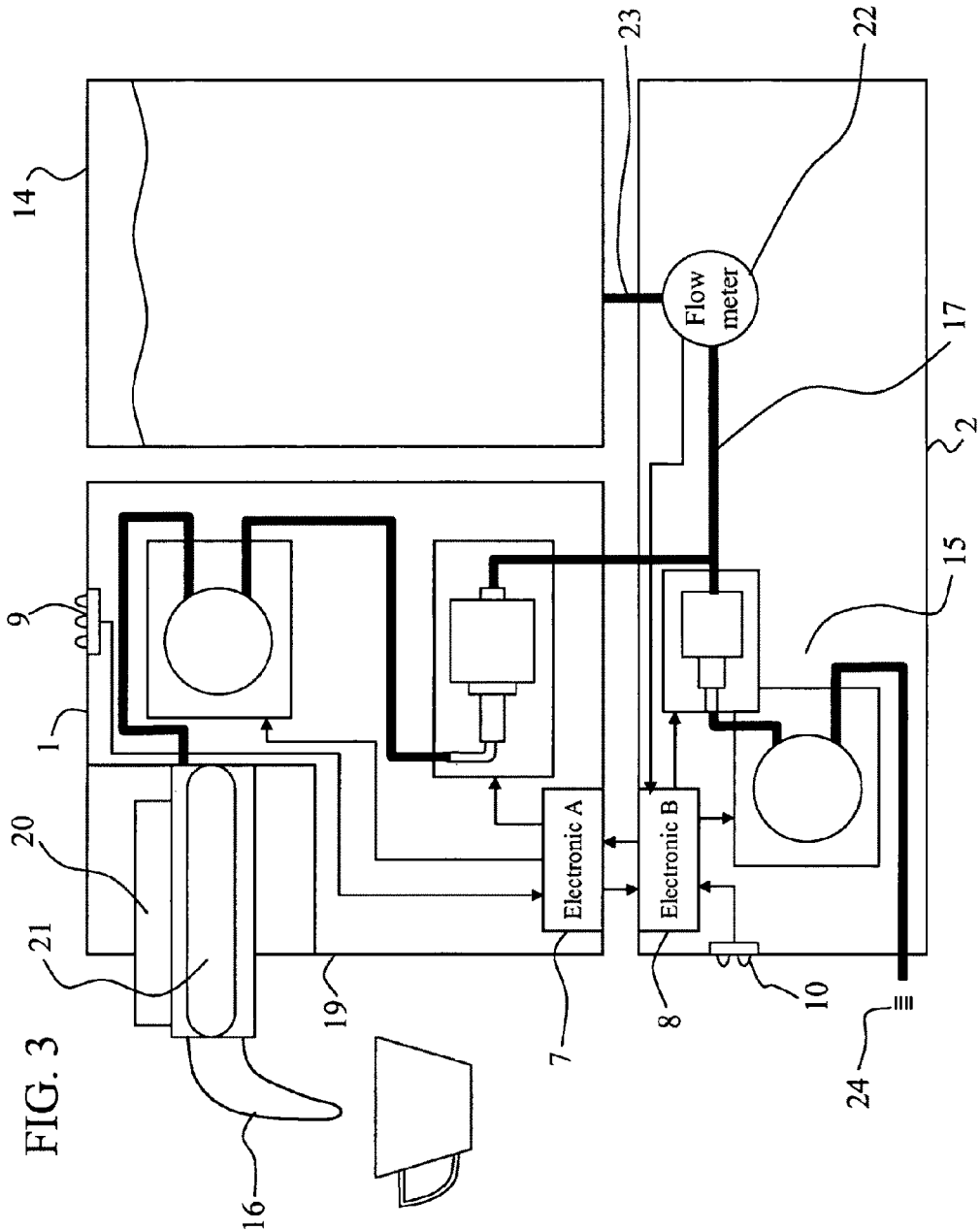
Figure 4:
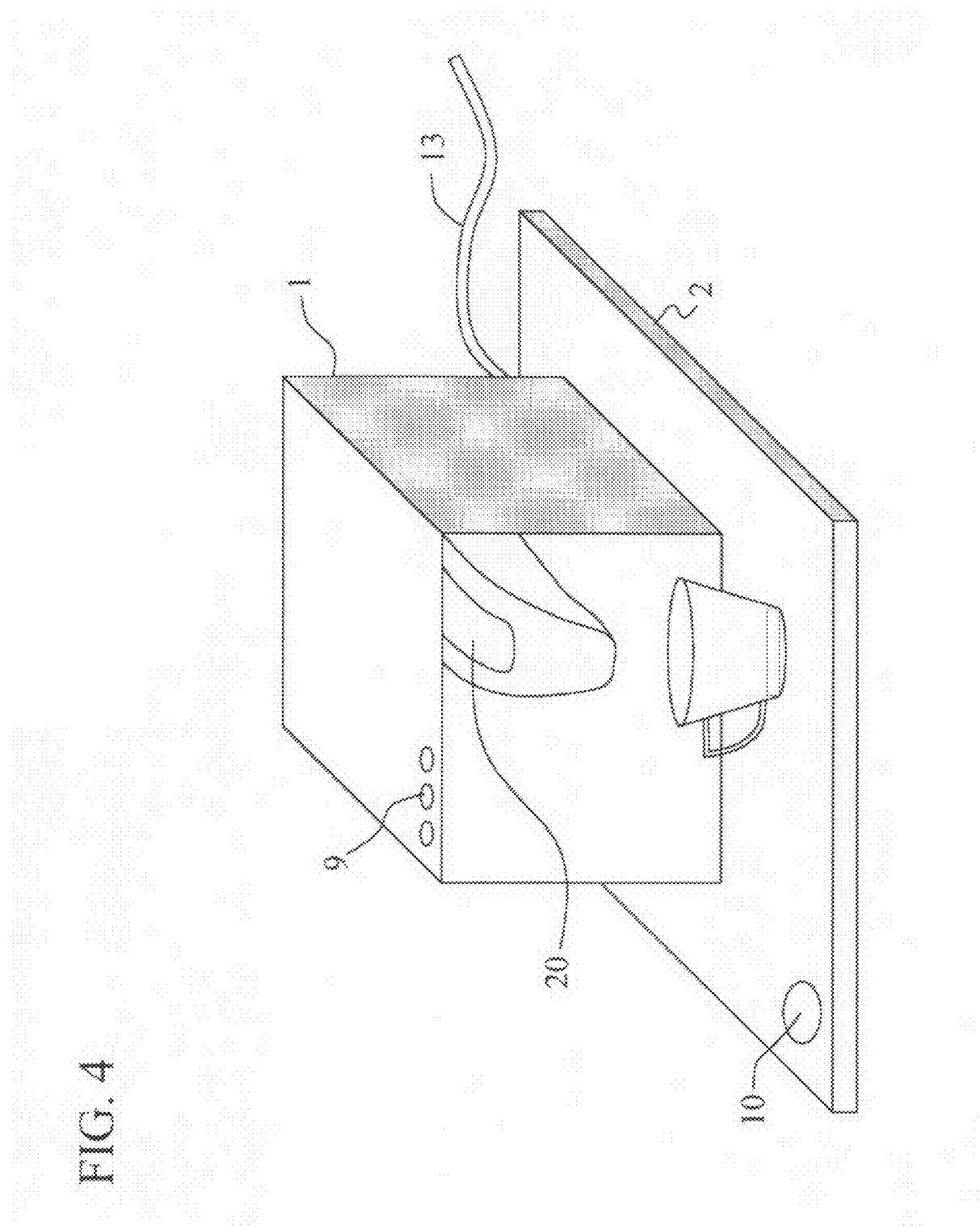
Figure 5:
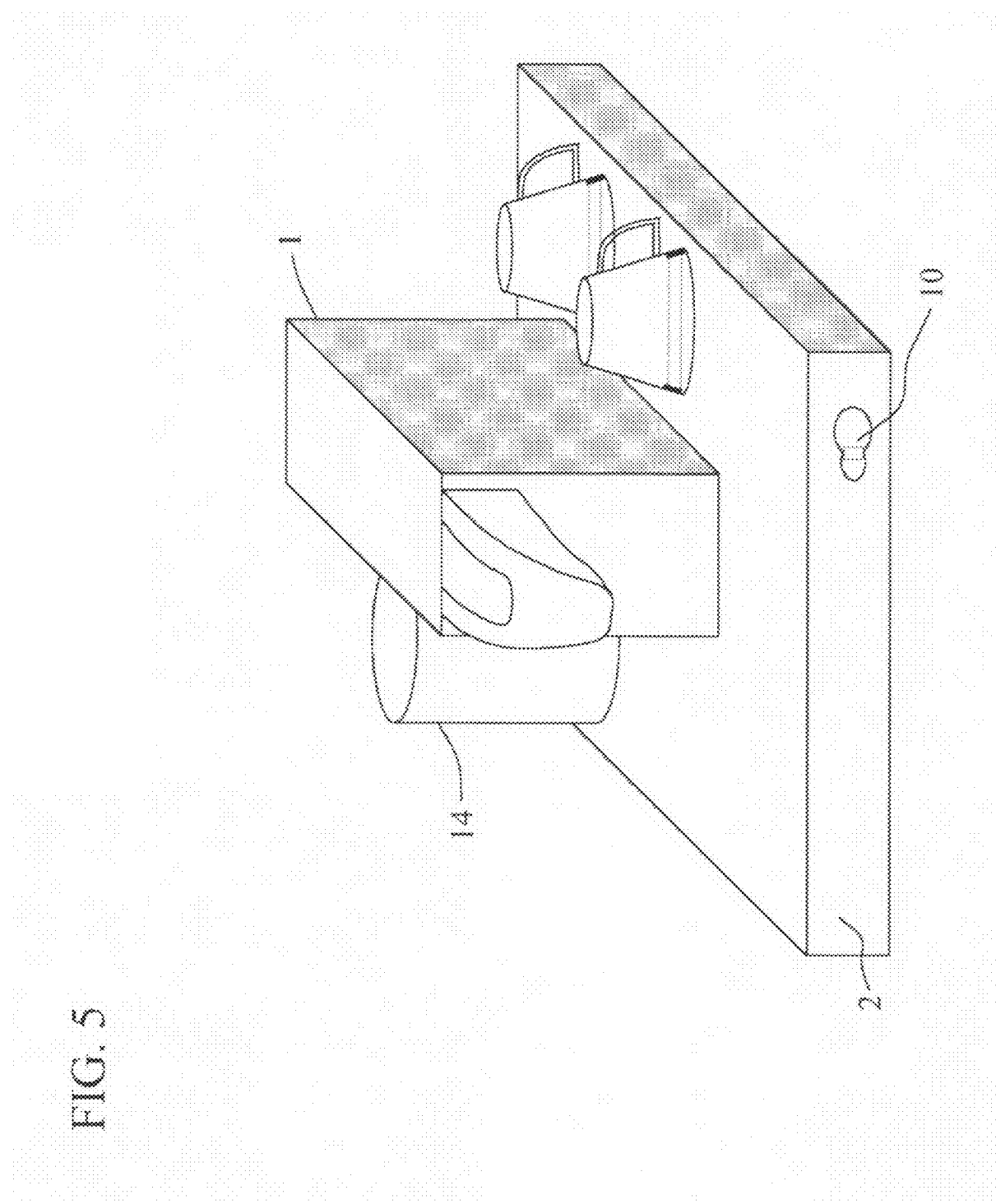

FIG. 1 shows a first embodiment of the present invention in which the module is connected to a docking station and wherein the module is directly connected to a water tank, FIG. 2 shows a further embodiment of the invention in which the docking station has a flow meter and takes over at least partially the fluid management of the module, FIG. 3 shows a still further embodiment of the present invention in which the docking station has additional functionality, such as for example the production of steam to the functionality of the module, FIG. 4 shows an implementation in which the module is provided with its own water tank, but relies on the electric power supply of the docking station, and FIG. 5 shows a still further embodiment of the present invention in which the module relies on a water supply (water tank) of the docking station.

As can be seen in FIG. 1, this embodiment of the invention proposes an autonomous beverage production module 1. The beverage production module 1 comprises a water inlet 18, a water pump 3 and water heating means, such as for example a boiler, a thermoblock 4 or a low thermal inertia on-demand heater. The heated and pressurized water from the water heating means 4 and the water pump 3 can be supplied to a beverage production unit which e.g. comprises an ingredient-containing capsule 21 housed in an extraction/brewing chamber 20. The term "capsule" means any type of suitable packages containing food ingredients adapted to be inserted in the extraction/brewing chamber such as a sealed aluminium or plastic capsule and/or a filter pod.

The extraction chamber 20 of the module 1 is designed to inject the water into the capsule 21 and to output the thus produced beverage, which is the result of an interaction of the water with the ingredients and the capsule 21, at a beverage outlet 16.

When connected to a water supply, the autonomous module 1 can thus produce a beverage by carrying out the basic necessary functions. To this regard, the electric connector 11 in the walls 19 of the casing have to be connected e.g. to mains.

The module 1 can be provided with a user interface such as for example control buttons 9, touch screens etc. The user control interface 9 is functionally connected to an electronic control circuitry 7 of the module 1 controlling at least the operation of the water pump 3 and the water heating means 4 in response to the user manipulating the user control interface 9.

The water inlet port 18 of the module 1 can be connected to a water tank 14.

In a so-called disconnected state the module 1 can thus be operated autonomously and can thus produce a beverage on the basis of the ingredients contained in the capsule 21 without being connected to the docking station 2.

By connecting the module 1 to the docking station 2 the relatively simple module 1 can be expanded regarding its flexibility and functionality as the docking station 2 is provided with electric control resources, liquid resources, user interfacing resources (input and information display etc.) and electrical power resources such that the combination module/docking station in the connected offers advanced functionality to the user.

The docking station 2 can be provided with its own electrical power supply 13 (e.g., an electrical power cord), wherein the power supplied to the docking station can then be forwarded from the docking station 2 to the module 1 via connectors 11, 12.

Furthermore, as can be seen from FIG. 1, also the docking station 2 is provided with its own electronic control circuitry 8 being in functional connection with a user interface 10 of the docking station 2.

The module 1 is provided with data interfacing means 5 and the docking station 2 is provided with data interfacing means 6 which can communicate with each other in an uni-directional (i.e., from docking station to module), but preferably, bi-directional manner.

Preferably the docking station 2 sends control commands to the module 1 and receives status information from the module 1.

As the interfacing means 5, 6 are functionally connected with the respective electronic control circuitries 7 and 8 respectively, the control circuitries 7, 8 of the docking station 2 and the module 1 can communicate with each other in a bi-directional manner.

By manipulating the user interface 10 of the docking station 2 a user can thus influence the operation and behaviour of a connected module 1, as the electronic control circuitry 8 of the docking station 2 will evaluate the user's input and issue corresponding control commands to the electronic control circuitry 7 of the module 1.

The docking station 2 can monitor the current status of the module 1 and the operations carried out by the module 1 by receiving status information including operational parameters from the module 1.

Note that the bi-directional communication between the module 1 and the docking station can be implemented in a wire-bound or a wireless manner. In case of wireless communication e.g. RF-transmission (e.g. Bluetooth etc.), an inductive coupling or infrared communication can be used.

Preferably, the electronic control circuitries of the docking station 2 and the module 1 are hierarchically organized according to the master-slave principle. In other words, when the module 1 and the docking station 2 are in the connected state, which means that at least the interfacing means 5, 6 of the module 1 and the docking station 2, respectively, are able to communicate with each other, the electronic control circuitry 8 will at least partially take over the command over the connected module 1.

This taking over of the control of the operation of the module 1 by the docking station can encompass e.g. the fluid management, electrical power management, control of the sequence of operations, etc.

FIG. 2 shows a further embodiment of the present invention in which the docking station 2 is also physically designed to control the fluid management of a connected module 1. In the embodiment of FIG. 2 the docking station is provided with a flow meter 22 which is in functional connection with the functional circuitry 8 of the docking station 2. Via the flow meter 22 the electronic control circuitry 8 is thus able to monitor the liquid flow from a water tank 14 connected via a port 23 to the docking station 2, which liquid flow is then transferred at a port 18 to the connected module 1.

In a different embodiment (not shown), the flow meter 22 can be implemented in the module 1. In this case, the electronic control circuitry of the module can manage the volume of the beverage which is delivered in the disconnected state of the module and the module is used in the autonomous mode.

To this regard, the docking station 2 is provided with internal liquid guiding means 17 which preferably serve for the transport of unpressurised liquid only.

Via the flow meter 22 the electronic control circuitry 8 of the docking station 2 can thus control the amount of liquid flowing through the water pump 3 and the heating means 4 of the module 1 and then thus carry out a management of the volume of the beverage or a control of the water temperature (i.e., "Beverage temperature management"), for example, by using temperature sensors in the module.

Based on the information supplied from the flow meter the control circuitry 8 of the docking station 2 can actually control the operations of the water pump 3 and/or the heating means 4 (and optionally also further elements of the module 1) through the communication with the electronic control circuitry 7 of the module 1.

FIG. 3 shows a still further embodiment in which the docking station is provided with means 15 for producing steam as well as with a steam outlet 24.

The illustrative embodiment of FIG. 3 is just one example as how the electronic control circuitry 8 of the docking station 2 can control further electric and hydraulic elements in addition to the elements of the module 1.

These additional elements can e.g. be additional modules connected to the docking station 2. In this case the docking station 2 is adapted to mechanically and electronically be connected to a plurality of beverage production modules.

The electronic control circuitry 8 can then e.g. carry out the power management for all connected electrical elements. For instance, the electronic control circuitry 8 of the docking station 2 can monitor whether operations instructed by the user via user interfaces 9 of modules 1 or user interfaces 10 of docking stations 2 require and electrical power going beyond the maximum of the admissible power.

Electronic control circuitry 8 of the docking station 2 can thus organize the sequence of operations of connected modules 1 and the electronic power consuming elements thereof.

FIG. 4 illustrates an embodiment in which the docking station 2 has a power cord 13 for electrically supplying the module when in the connected state. The docking station 2 further comprises a panel of its top surface, user interface means, i.e., a switch board 10, operationally connected to the control circuitry of the docking station in order to drive the operations of the module when in connected state on the docking station.

In the shown example a single beverage production module 1 is connected to the top surface of the panel-shaped docking station 2.

FIG. 5 finally shows an embodiment in which the user interface means 10 are provided at the front wall of a panel-shaped docking station 2.

A water tank 14 is arranged on a top surface of the panel-shaped docking station 2 thus that the beverage production 1 is supplied with water through and under the control of the docking station 2.

List of Reference Signs

1 Module
2 Docking station
3 Water pump
4 Thermoblock
5 Data interface of the module
6 Data interface of the docking station
7 Control circuitry of the module
8 Control circuitry of the docking station
9 User interface of the module
10 User interface of the docking station
11 Electrical connector of the module
12 Electrical connector of the docking station
13 External power supply for the docking station
14 Water tank
15 Steam-producing means of the docking station
16 Beverage outlet of the module
17 Water channels in the docking station
18 Water inlet of the module
19 Casing of the module
20 Extraction chamber of the module
21 Capsule containing beverage ingredients
22 Flow meter of the docking station
23 Water port of the docking station
24 Steam outlet

The invention claimed is:

1. A beverage production module for producing a beverage from ingredients contained in a capsule to be inserted into the module, with the module comprising:
   a water pump,
   a water heater,
   autonomous control circuitry for controlling the operation of the module,
   extraction chamber designed for housing the capsule and preparing the beverage using the capsule,
   data communication interfacing means, which is functionally connected to the control circuitry of the module and adapted for:
   a. receiving and transmitting information from or to an external docking station to which the module can be connected, and
   b. transmitting the received information to the control circuitry.

2. The module according to claim 1, wherein the data communication interfacing means is a communication interface designed for wireless or infrared communication.

3. The module according to claim 1, wherein the module is provided with a connector for selectively connecting the module to an external power supply.

4. The module according to claim 1, wherein the module is provided with a water interface connector adapted to be selectively connected to external water supply means.

5. The module according to claim 4, wherein the water supply means comprises a removable water tank with a complementary water interface connector.

6. A docking station for a beverage production module, adapted to be connected to a beverage production module according to claim 1, and comprising:
means for mechanically attaching the module to the docking station at a defined connected position,
electrical connecting means for feeding electrical power to the module when connected to the docking station, and
data interfacing means for bi-directionally exchanging data with the data communication interfacing means of the module when connected to the docking station.

7. The docking station according to claim 6, which further comprises means for supplying water to a connected module or means for supplying essentially unpressurized liquid to the water pump of the module.

8. The docking station according to claim 7, which further comprises a flow meter and control means for receiving volume fluid information from the flow meter to control the water pump of the module.

9. The docking station according to claim 6, wherein the docking station is adapted to be connected to a tank and to provide a fluid connection from the tank through the docking station to the module.

10. The docking station according to claim 6, which further comprises means for producing and outputting steam from a supplied liquid, and an additional pump and an additional heater to provide steam to a steam outlet of the station independently from the module.

11. The docking station according to claim 6, which further comprises means for connecting the docking station to an external power supply and an electrical connector for forwarding the electrical power to a connected module.

12. The docking station according to claim 6, which further comprises control circuitry functionally connected to an interface of the docking station.

13. The docking station according to claim 12, which further comprises a user interface functionally connected to the control circuitry and designed for manually entering operation commands to the docking station.

14. A hierarchical modular beverage production system, comprising a docking station and a beverage production module selectively adapted to be in a connected state and a disconnected state, respectively, with the docking station, wherein the module includes means for producing a beverage from ingredients contained in a capsule, and the docking station and module are each provided with control circuitry, with the control circuitry of the module being designed for autonomous control of the module in the disconnected state, and the control circuitry of the docking station being designed to at least partially take over control of the module in the connected state, wherein the docking station comprises steam generating circuitry which is independent from the module.

15. A hierarchical modular beverage production system comprising a docking station and a beverage production module selectively adapted to be in a connected state and a disconnected state, respectively, with the docking station, wherein the module includes means for producing a beverage from ingredients contained in a capsule, and the docking station and module are each provided with control circuitry, with the control circuitry of the module being designed for autonomous control of the module in the disconnected state, and the control circuitry of the docking station being designed to at least partially take over control of the module in the connected state, wherein the module comprises:
a water pump,
a water heater connected to the water pump, and
an extraction chamber designed for housing the beverage ingredient containing capsule and being supplied with heated pressurized water,
wherein the module and docking station are respectively provided with:
means for transferring electrical power from the docking station to the module, and
water connection means for supplying water from the docking station to the module.

16. The system according to claim 15, further comprising a data communication interface for exchanging data between the docking station and module when the two are mechanically connected.

17. A hierarchical modular beverage production system, comprising a docking station and a beverage production module selectively adapted to be in a connected state and a disconnected state, respectively, with the docking station, wherein the module includes means for producing a beverage from ingredients contained in a sealed capsule, wherein the module comprises a chamber for receiving and housing the sealed capsule and includes means for an injection of water into the sealed capsule; and a beverage outlet for outputting the beverage thereby produced, and wherein the docking station and module are each provided with control circuitry, with the control circuitry of the module being designed for autonomous control of the module in the disconnected state, and the control circuitry of the docking station being designed to at least partially take over control of the module in the connected state.

18. The system according to claim 17, wherein the docking station and the module are respectively provided with interfacing means designed to set up a bi-directional communication between their respective control circuitries and the module is operatively associated with components for supplying a liquid to the capsule for combining with the ingredients to form a beverage and to dispense the beverage from the capsule.

19. The system according to claim 18, wherein the control circuitry of the docking station carries out electrical power management of the docking station and the module.

20. The system according to claim 17, wherein the docking station is provided with user interface means designed to control the operation of the module in the connected state.

21. The system according to claim 17, wherein the module is supplied with water (a) from an independent, removable water tank in the disconnected state and (b) from a water supply tank controlled by the docking station in the connected state.

22. The system according to claim 17, wherein the means for transferring electrical power is an electrical power supply and the module is supplied with power from an independent electrical supply set when in the disconnected state and from the docking station via electrical connecting means in the connected state.

* * * * *